A. Smith
Cutting & Grinding Animal Matter.
No. 71544. Patented Nov. 26, 1867.
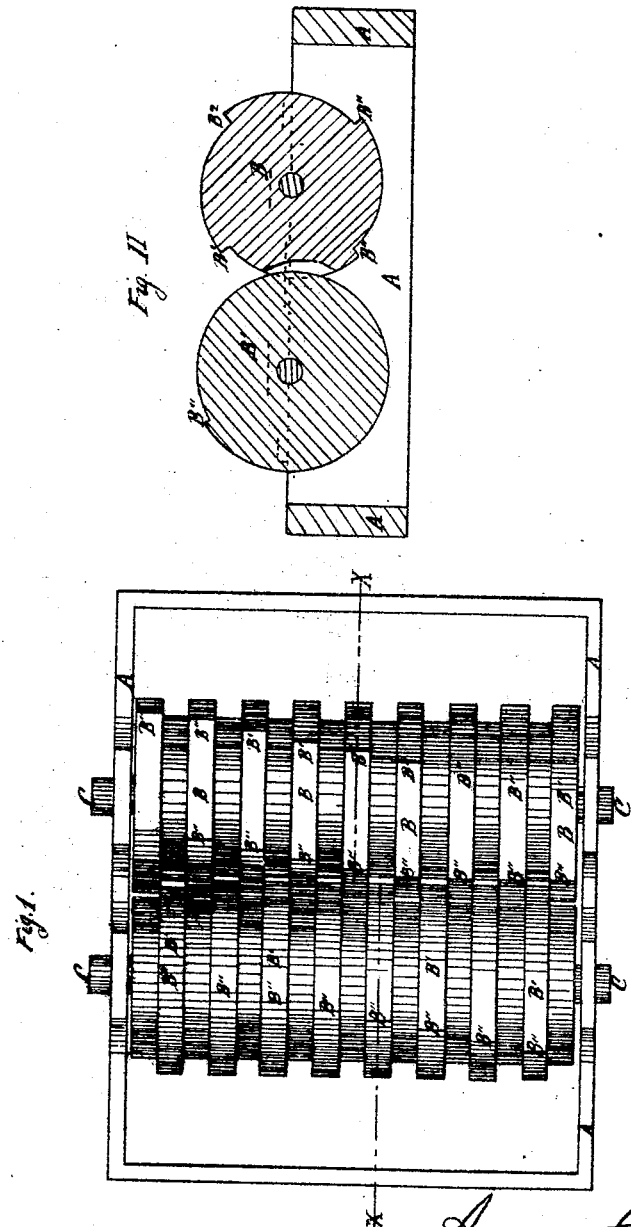
Witnesses
Lawrence Murphy
Chas. F. Clausen
Amos Smith
Inventor by
Dr. Holloway & Co.
His Attys.

UNITED STATES PATENT OFFICE.

AMOR SMITH, OF CINCINNATI, OHIO.

IMPROVEMENT IN MACHINE FOR CUTTING AND GRINDING ANIMAL MATTER.

Specification forming part of Letters Patent No. 71,544, dated November 26, 1867.

*To all whom it may concern:*

Be it known that I, AMOR SMITH, of Cincinnati, in the county of Hamilton and State of Ohio, have invented a new and useful Improvement in Machines for Cutting and Grinding Animal Matter for use as a fertilizer, and also for reducing cracklings in preparing them for the press; and I do hereby declare that the following is a full, clear, and exact description of the same, reference being had to the annexed drawings, in which—

Figure 1 is a plan; and Fig. 2 is a vertical section on the line $x\ x$, Fig. 1.

The same letters in both figures, where used, indicate the same parts.

I have heretofore obtained Letters Patent of the United States for the preparation of the boiled refuse animal matter for use as a fertilizer; and this invention relates to a machine for grinding that material for this purpose.

A is a frame inclosing the rollers B B$^1$, which turn upon journals C, the bearings of which are attached to the frame. There are two metallic rollers, both intended to be positively actuated by gearing or by belts, revolving in opposite directions. The rollers are constructed with a series of ribs passing around the circumference of the rollers, and so arranged that those on one roller shall fit between those of the other. The corners of these ribs are made square, to form, in connection with one another, shears, by which the animal matter may be cut as it is forced between them.

The periphery of the ribs is formed by a series of eccentric curves, terminating with square notches at B$^2$, so arranged in relation to one another as to stand in spiral order, as shown in Fig. 1. These notches serve as hooks to catch the pieces to be acted upon, and, drawing them toward the point of action between the rollers, to hold them while being exposed to the shearing action of the ribs.

What I claim as my invention, and desire to secure by Letters Patent, is—

1. The combination of two metallic rollers with interlocking ribs, square upon their edges, arranged for use substantially in the manner and for the purpose set forth.

2. The mode of feeding the animal matter to the shearing-ribs, by means of notches B$^2$ on the periphery of the ribs, substantially as set forth.

In testimony whereof I have signed my name to this specification in the presence of two subscribing witnesses.

AMOR SMITH.

Witnesses:
JOHN ELLIS,
AMOR SMITH, Jr.